(12) United States Patent
Graushar et al.

(10) Patent No.: US 6,694,219 B2
(45) Date of Patent: Feb. 17, 2004

(54) METHOD AND APPARATUS FOR ASSEMBLING PERSONALIZED ELECTRONIC MEDIA INTO PRINTED PRODUCTS

(75) Inventors: William T. Graushar, Wauwatosa, WI (US); John C. Geres, West Allis, WI (US)

(73) Assignee: Quad/Graphics, Inc., Sussex, WI (US)

( * ) Notice: Subject to any disclaimer, the term of this patent is extended or adjusted under 35 U.S.C. 154(b) by 22 days.

(21) Appl. No.: 10/060,687

(22) Filed: Jan. 30, 2002

(65) Prior Publication Data

US 2002/0100253 A1 Aug. 1, 2002

Related U.S. Application Data

(60) Provisional application No. 60/265,730, filed on Feb. 1, 2001.

(51) Int. Cl.[7] .................................................. B65B 11/10
(52) U.S. Cl. ..................... 700/223; 270/1.01; 270/1.02; 270/1.03; 53/411; 53/254; 53/131.4
(58) Field of Search .............................. 270/1.01, 1.02, 270/1.03, 52.01, 52.02, 52.03, 52.19, 52.18, 58.01; 283/904; 235/900; 700/220, 221, 223, 224; 53/254, 461, 411, 474, 131.4, 206; 360/131, 132, 133

(56) References Cited

U.S. PATENT DOCUMENTS

| | | | |
|---|---|---|---|
| 3,819,173 A | * | 6/1974 | Anderson et al. ........ 270/52.04 |
| 3,899,165 A | | 8/1975 | Abram et al. |
| 4,576,370 A | * | 3/1986 | Jackson .................. 270/52.03 |
| 4,989,852 A | | 2/1991 | Gunther, Jr. |
| 5,039,075 A | | 8/1991 | Mayer |
| 5,114,128 A | | 5/1992 | Harris, Jr et al. |
| 5,317,654 A | * | 5/1994 | Perry et al. ................. 382/101 |
| 5,388,815 A | * | 2/1995 | Hill et al. ...................... 270/32 |
| 5,419,541 A | | 5/1995 | Stevens |
| 5,419,587 A | | 5/1995 | McClure et al. |
| 5,458,323 A | | 10/1995 | Magee et al. |
| 5,568,942 A | | 10/1996 | Stevens |
| 5,590,912 A | | 1/1997 | Stevens |
| 5,634,633 A | * | 6/1997 | Graushar ................. 270/58.05 |
| 5,655,759 A | | 8/1997 | Perkins et al. |
| 5,950,401 A | | 9/1999 | Blohm et al. |
| 5,988,620 A | * | 11/1999 | Graushar ................... 270/1.02 |
| 6,059,316 A | * | 5/2000 | Whittington ................. 281/38 |
| 6,068,117 A | * | 5/2000 | Koehn ........................ 206/232 |
| 6,126,201 A | * | 10/2000 | Pace et al. .................... 281/29 |
| 6,302,388 B1 | * | 10/2001 | Graushar et al. .......... 270/1.02 |
| 6,484,878 B1 | * | 11/2002 | Combs .................... 206/308.1 |

* cited by examiner

*Primary Examiner*—Patrick Mackey
(74) *Attorney, Agent, or Firm*—Michael Best & Friedrich LLP

(57) ABSTRACT

A method and apparatus for assembling personalized CDs, DVDs and other types of optical disks, magnetic media, and data storage devices into magazines, catalogs, pamphlets, and other printed products in order to enhance the amount and quality of personalization associated with the printed product includes reading and/or writing personalized information to/from a data storage device and assembling the data storage device within a printed product that is to be delivered to a particular individual. The reading and/or writing of personalized information may be directed to either digital information stored on the data storage device or to more conventional optical indicia that is printed on and/or optically scanned from the data storage device.

35 Claims, 3 Drawing Sheets

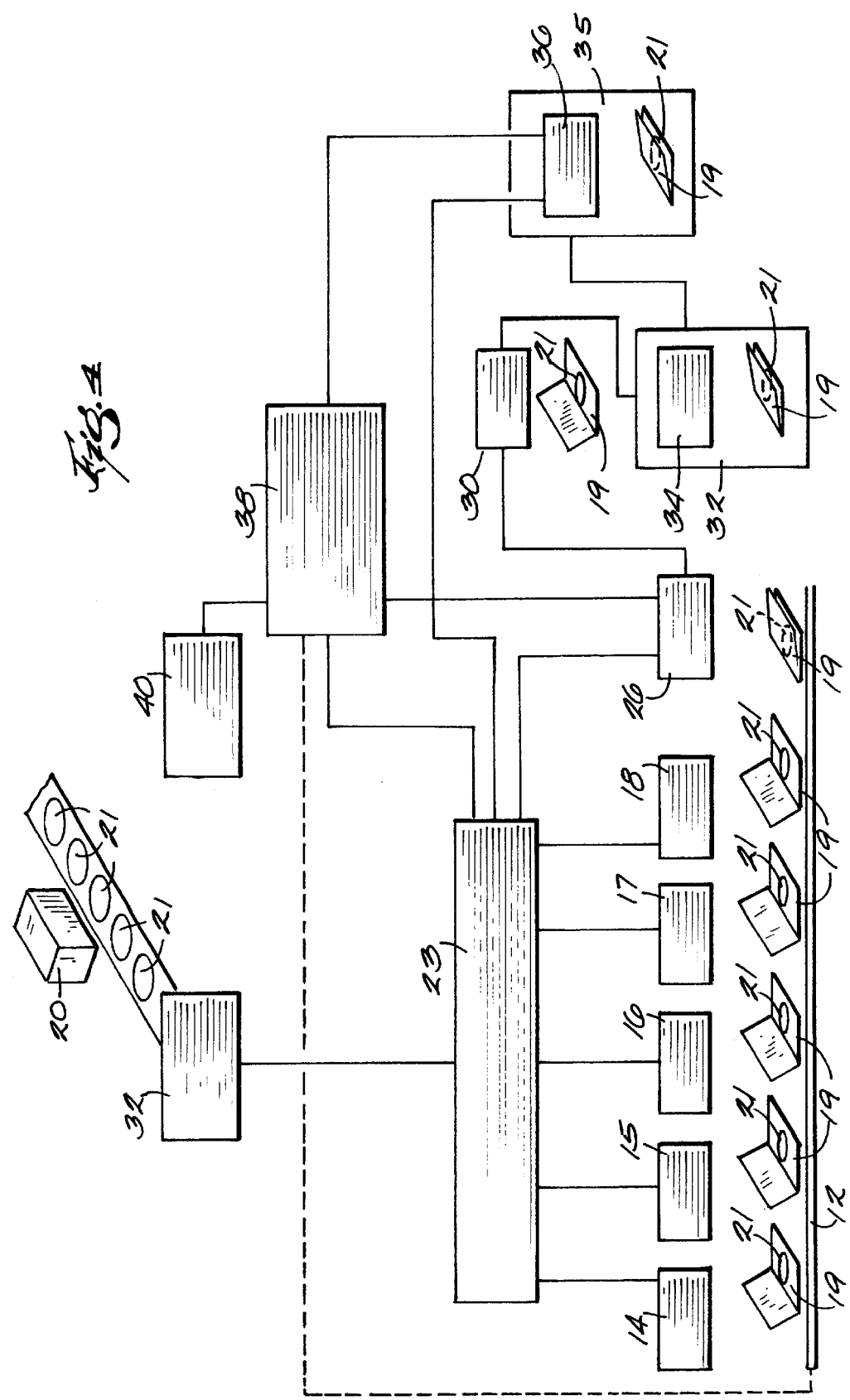

METHOD AND APPARATUS FOR ASSEMBLING PERSONALIZED ELECTRONIC MEDIA INTO PRINTED PRODUCTS

This application Claims the benefit of provisional 60/265,730 filed Feb. 1, 2001.

FIELD OF THE INVENTION

The present invention relates to the production of print media such as magazines, catalogs, pamphlets and envelopes that include electronic media, such as DVDs, CDs, and cards which include magnetic strips, (hereafter collectively referred to as "CDs"), and more particularly to printed media that includes CDs with personalized information.

BACKGROUND OF THE INVENTION

"Magazine" as used herein generically refers to magazines, books, catalogs, pamphlets, envelopes and other printed materials. Magazines are typically assembled through either conventional saddle stitch or perfect binding processes and it should be noted that the present invention may be used in conjunction with saddle stitch, perfect binding, and other binding methods.

Magazine printers commonly customize magazines by including particular signatures within a magazine based on known characteristics of the recipient. This type of customization is known in the print media as selective binding. Selective binding is done by selectively placing designated signatures that are stored in different hoppers along a binding line onto the binding line such that magazines are assembled using a particular set of designated signatures based on a recipient's profile.

Magazine printers now go even further in that individual magazines are produced with unique personalized information or indicia relating to the magazine's intended recipient. One of the more common ways to personalize a magazine is to have the recipient's identity and address information printed on the cover of the magazine once the magazine is assembled. Another method of personalizing magazines relates to printing personalized indicia onto one or more signatures before the signatures are assembled into respective magazines. Signatures are often personalized while they are on the binding line by using an ink jet printer positioned near the binding line. As the signatures pass the ink jet printer, personalized information or indicia is printed onto one or more of the signatures.

As the popularity of CDs has increased, magazine printers have begun inserting CDs into magazines as part of the assembly process. Therefore, it would be desirable if the CDs could be incorporated into the personalization process associated with assembling magazines.

SUMMARY OF THE INVENTION

The present invention provides a method of assembling personalized CDs, DVDs and other types of optical disks, magnetic media, and data storage devices into magazines, catalogs, pamphlets, and other printed products in order to enhance the amount and quality of personalization associated with the printed product. The method of the present invention includes reading and/or writing personalized information to/from a data storage device and assembling the data storage device within a printed product that is to be delivered to a particular individual. As discussed further below, the reading and/or writing of personalized information may be directed to either digital information stored on the data storage device or to more conventional optical indicia that is printed on and/or optically scanned from the data storage device.

In one form of the invention, the personalized information is written onto the data storage device using a data-writing machine that may be located at a position on or immediately adjacent to the binding line. The data-writing machine may also be part of one of the hoppers positioned along the binding line such that after the hopper writes the personalized information onto the data storage device, the hopper assembles the data storage device into the printed product. Once the data storage devices are positioned within the assembled printed products, the printed products can be trimmed, sorted, or otherwise manipulated as usual. It should be noted that in a selective binding operation, pre-personalized data storage devices can be inserted into the printed product where some, all or none of the printed products are selectively bound without departing from the scope of the present invention. In addition, personalized data storage devices can be placed inside printed products that are, or are not, otherwise personalized. As used herein, "personalized data storage device" refers to CDs, DVDs, and other digital media storage devices that have been modified to include specialized optical indicia and/or specialized digital data.

In another form of the invention, the method of assembling the printed product includes reading information from a data storage device and assembling the printed product based on the information read from the data storage device. The data storage devices are read using a data-reading machine. On bindery lines that include selective binding capabilities, the information retrieved from the data storage device may be supplied to a control system that directs the selective binding process. After the data storage device has been read the data storage device may be assembled into an appropriate printed product on the bindery line.

In yet another form of the invention, one or more data-reading machines read personalized information from the data storage devices and then supply the information to a control system. The control system determines specific address information based on the personalized information that is read from a particular data storage device. The address information is delivered to a printer positioned near the binding line such that the printer prints the address information on a cover of the printed product that includes the respective data storage device.

One or more additional printers may also be used to print personalized indicia that corresponds to the personalized information read from the respective data storage devices onto forms and/or preprinted non-personalized signatures. The newly personalized forms and/or signatures are then delivered to one or more hoppers on the bindery line for assembly into an appropriate printed product. It should be noted that the printer could be located at an entirely different facility. The personalized forms and/or signatures are inserted into an otherwise customized or non-customized printed product depending on the desired finished form of the printed product.

In still another form of the invention, the data storage devices that include personalized information written thereon include personalized indicia (e.g., address information) printed on the front of the data storage device. These preprinted data storage devices may be positioned immediately inside the cover of the printed product. The cover of the printed product may also be provided with a transparent window such that when the cover is closed, the personalized information printed on the data storage device is visible through the transparent window. Since the address information on the front of the data storage device is visible through the transparent window, the need for on-line address printing is eliminated. In addition, an individual handling a printed product can easily tell that there is a data storage device within the printed product without opening the printed product. It should be understood that the data storage devices may be attached to a signature somewhere in the printed product other than the signature that is adjacent to the cover, in this regard, the transparent window may then be located on an adjacent signature.

In another form of the invention, personalized information is written onto the data storage devices and the data storage devices are loaded into one of a plurality of hoppers. Personalized information is read from the data storage devices and printed products are assembled with personalized signatures that correspond to the personalized information read from the data storage devices (e.g. selectively bound). The data storage devices may then be attached to one of the signatures in the personalized printed product to which it corresponds.

In yet another form of the invention, data storage devices that include personalized information written thereon are assembled within the printed product and then the quality of the printed product is tested by any number of conventionally know techniques. When a particular printed product does not pass one of the tests that are conducted, the data storage device may be removed and the personalized information written thereon is read by a data-reading machine such that an appropriate replacement printed product may be subsequently assembled.

Other features and advantages of the invention will become apparent to those of ordinary skill in the art upon review of the following detailed description, claims and drawings.

BRIEF DESCRIPTION OF THE DRAWINGS

FIG. 4 is a schematic diagram of another embodiment of the binding line and accompanying controls according to the present invention

DETAILED DESCRIPTION OF THE PREFERRED EMBODIMENT the present invention relates to the assembly of magazines, catalogs, books, pamphlets, and other printed products. In particular, the invention relates to the assembly of these printed products with personalized data storage devices such as CDs and DVDs (commonly referred to as optical discs), magnetic media such as floppy disks or cassette tapes, as well as cards carrying magnetic strips. While the teachings of the present invention are applicable to each of the above mentioned situations as well as others, for the sake of brevity and clarity, the invention will be described further below only with respect to the assembly of a personalized compact disc with a magazine.

Figure 1:
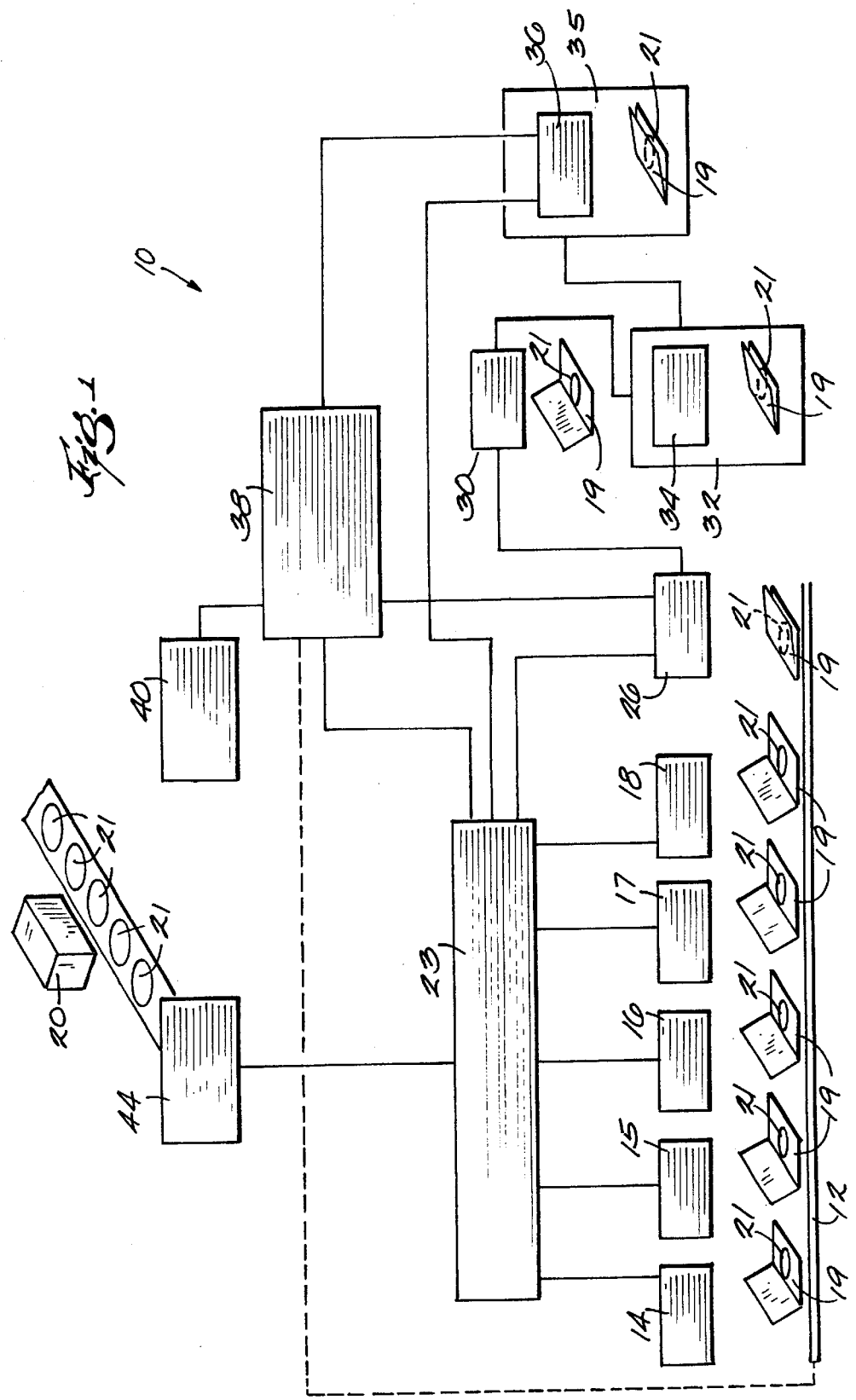
FIG. 1 is schematic diagram of part of a binding line and accompanying controls illustrating the apparatus and method of the present invention.

FIG. 1 discloses a saddle stitch bindery line 10 for assembling magazines. The bindery line 10 includes a chain 12 that moves past a plurality of hoppers 14, 15, 16, 17, and 18. As the chain 12 moves past the hoppers 14–18, signatures 19 are delivered from the hoppers 14–18 either directly onto the chain 12 or over another signature. "Signature" as used herein generically refers to paper pages and/or packaging inserts. The signatures 19 may be selectively fed onto the chain 12 in order to customize certain magazines as is known in the art. Although only five hoppers are shown delivering signatures to the chain, it should be understood that most bindery lines include many more hoppers. In addition, any hopper that is well known in the art can be used as part of the bindery line without departing from the scope of the present invention.

The chain 12 is driven by a motor (not shown) that is connected to a control system 23. The control system 23 monitors the position of each magazine as it is being assembled on the chain 12 as is well known in the art.

In one form of the invention, personalized information is written (e.g. burned) to a CD 21 by a data-writing machine 20 configured to write data to a CD. The CD writing machine 20 is adapted to provide many different types and amounts of personalization. One example of a suitable CD/DVD writing machine 20 is the DVD100i drive available from Hewlett-Packard Company of Palo Alto Calif. In preferred embodiments, the CD 21 will have generic information pre-burned onto the CD, in this respect, the CD writing machine 20 need only write the additional personalized information to the CD 21, thereby reducing the amount of time required to personalize the CD 21. In some embodiments, a personalized CD 21 is loaded into a storage area 44 where the CD 21 is stored until needed for a particular magazine. During assembly of the magazines, the personalized CDs are loaded into a designated hopper (e.g. hopper 14) from which they are individually selectively deposited into a magazine as directed by the control system 23. One example of a suitable hopper capable of feeding CDs or other digital storage devices is model no. ST850 available from Streamfeeder of Minneapolis Minn. In other embodiments, the CD 21 may be personalized just prior to insertion into a magazine. For example, a generic CD 21 may be fed to the CD writing machine 20, personalized, and then fed directly to the binding line for insertion into a magazine. U.S. Pat. Nos. 5,950,401 and 5,634,633 disclose methods and apparatus suitable for use with the present invention. These patents disclose the packaging of CDs and the securing of such a package to a magazine, the contents of the above patents are hereby incorporated by reference.

The personalized CDs 21 can be part of a personalized magazine, a customized magazine or a part of a combined customized/personalized magazine depending on the desired application. The personalized CDs may also be placed into standard magazines.

Once the magazine is assembled, a caliper 26 or other sensor senses the thickness of the magazine and supplies the thickness information to the control system 23. The control system 23 compares the measured thickness with a reference thickness in order to determine if the magazine has been appropriately assembled. Properly assembled magazines are transported to a stitcher 30 where the magazines are stapled before being moved to a conveyor table 32 where the edges are trimmed by a trimmer 34. Trimmed magazines are forwarded to a printing area 35 where personalized address indicia is printed in a designated location on the magazine cover signature using a printer 36. The control system 23 directs the printer 36 to print the personalized address indicia on the CD 21 and/or the magazine cover which corresponds to the personalized information that is written to the CD. Magazines that are being delivered to a common zip code are typically assembled together in bundles for easy handling by the U.S. Postal Service. It should be understood that the personalized address indicia may be printed on the CD and/or the magazine cover while the magazine is still on the binding line or at some other location, without departing from the scope of the present invention.

There are a variety of quality control tests for examining the quality of the magazines that are assembled on binding lines including, but not limited to, measuring the thickness of the magazine to determine if an appropriate number of signatures and/or CDs have been inserted into the magazine. As shown in FIG. 1, when a magazine does not pass the quality control test, rejected magazines are removed from the binding line and delivered to a data-reading machine 38 configured to read the information stored on the CD 21 of the rejected magazine. The CD reading machine 38 sends information to the control system 23 which subsequently directs the assembly system to fabricate a replacement magazine into which the CD 21 may be inserted. The replacement magazine may be either standard, customized, personalized, or customized/personalized. After a replacement magazine is ordered, the rejected magazines are sent to a storage area 40 for recycling or disposal. In some embodiments of the invention, the CD reading machine 38 is not necessary because the control system 23 is able to monitor which magazines have been inappropriately assembled.

Figure 2:
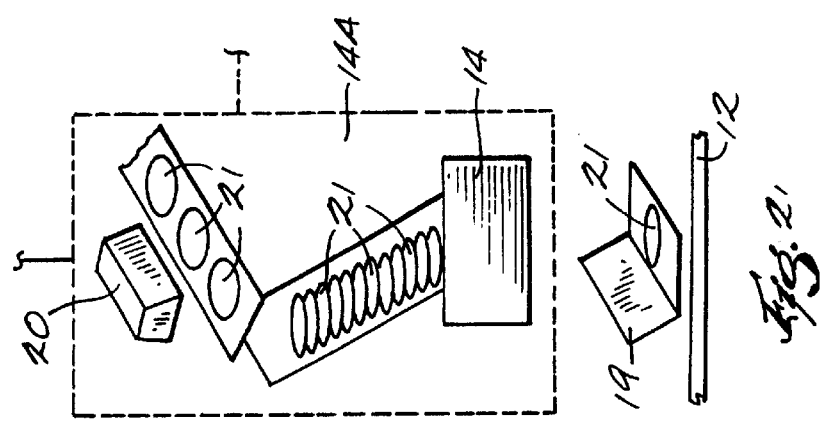
FIG. 2 is a schematic diagram of a portion of a binding line that includes a data storage device hopper adapted to write personalized information to a data storage device and to assemble the data storage device into a printed product being assembled on the binding line.

Referring to FIG. 2, the CD writing machine 20 may be combined with one or more of the hoppers 14–18 such that a specialized hopper 14A is created which writes personalized information to one, some, or all of the CDs that are stored within the hopper 14. During the binding operation, the control system 23 sends a signal to the specialized hopper 14A that directs the hopper 14A to write particular personalized information to a CD 21 and then to deliver the CD 21 to the binding line 12 at the appropriate time. Additional specialized CD loading hoppers that include the ability to read from or write to the CDs 21 may also be placed along the binding line 12 depending on the assembly application.

The specialized CD loading hoppers are adapted to assemble the CDs into the magazines in a variety of forms. One form includes a conventional plow station that separates the signatures 19 so that the CD 21 may be assembled into the magazine at the appropriate time. It should be understood that the configuration of the signatures may be adapted to a variety of known configurations in order to facilitate securing the CD 21 to the signatures 19. The CD 21 may also be assembled on the signature prior to being loaded into a hopper.

Figure 3:
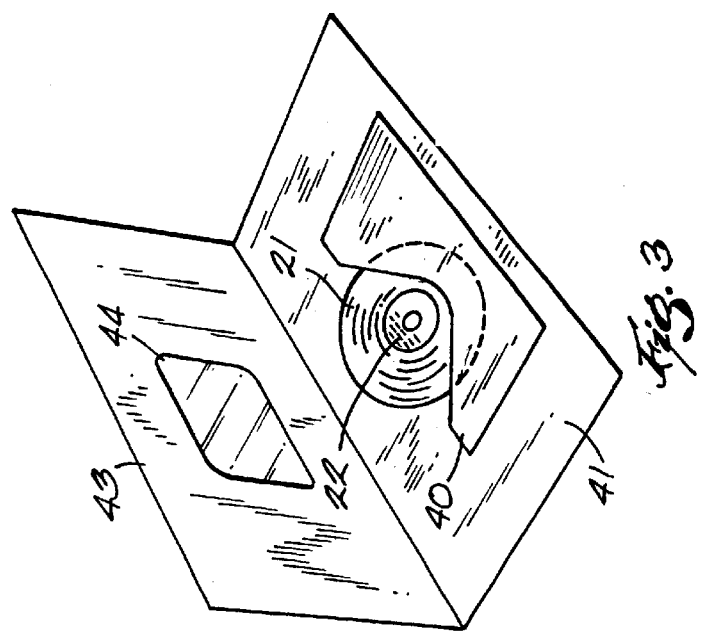
FIG. 3 illustrates a cover signature and an adjacent signature assembled according to the method of the present invention.

Referring to FIG. 3, one or more of the personalized CDs 21 may further include personalized information or indicia printed onto the face 22 of the CDs 21. The printing may be done by laser, ink jet or any other type of printer. One CD 21 is inserted into a pocket 40 that is secured to a portion of a signature 41 which is adjacent to a cover signature 43 of an assembled magazine. The cover signature 43 includes a transparent window 44 that overlies the printed personalized indicia on the face 22 of the CD 21 when the CD 21 is positioned within the pocket 40 and the cover signature 43 overlies the adjacent signature 42. It should be understood that the personalized indicia may be printed directly onto the adjacent signature 42 such that the transparent window 44 on the cover signature 43 overlies the personalized indicia making the personalized indicia and the CD visible through the transparent window 44 when the magazine is closed. The transparent window 44 may be provided in any signature throughout the magazine. In this respect, the pocket 44 would be formed in an adjacent signature as required to facilitate viewing of the personalized indicia that is printed on the CD through the transparent window 44.

Referring now to FIG. 4, another form of the invention includes a data-reading machine 29 that is adapted to read information stored on one or more CDs 21. The CD reading machine 29 transmits the information that is read from the CDs to the control system 23. The above-mentioned DVD 100i drive available from Hewlitt-Packard Company is also suitable for use as the CD reading machine 29. Based on the information delivered from the CD reading machine 29, the control system 23 directs which signatures are assembled into respective magazines on the binding line 12.

Figure 5:
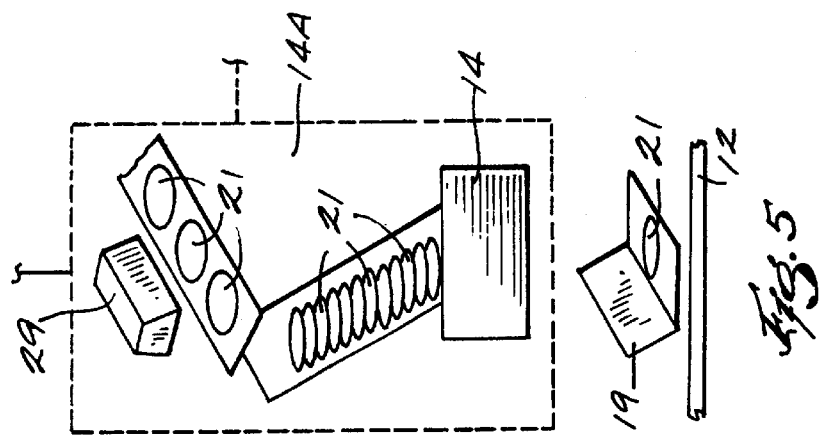
FIG. 5 is a schematic diagram of a portion of a binding line that includes a data storage device hopper adapted to read personalized information from a data storage device and to assemble the data storage device into a printed product being assembled on the binding line.

These CDs 21 may be read remotely from the binding line in which case these CDs are placed into a storage area 32 until they are subsequently needed for placement into appropriate magazines. When it is time for these CDs 21 to be placed into the appropriate magazines, the CDs 21 are delivered from storage area 32 to one or more of the hoppers 14–18 for placement into one or more of the magazines that are assembled on the binding line 12. An alternative form is shown in FIG. 5 where the personalized CDs are delivered directly to one of the hoppers 14–18. The specialized hopper 14A is equipped with CD reading machine 29 that reads the personalized information from the CD 21 and sends the information to the control system 23. Each CD 21 is then assembled into standard, customized, personalized or customized/personalized magazines. In addition, the information read from the CD 21 may be retained by the control system 23 and used to trigger personalized printing on the signatures, CDs or magazine cover by the printer 36. The signatures can also be tested, stitched, trimmed, and bundled in a manner similar to that described above with respect to FIG. 1.

In another form of the invention, the CD 21 may be placed into a queue at one of the hoppers 15–18 that is positioned further down the binding line. The CD 21 is read while it is being stored in the queue such that the control system 23 provides instruction to assemble an appropriate magazine which is then matched up to the particular CD for assembly into the proper magazine.

The present invention is not limited to the forms shown and described above, alternate forms will be apparent to those skilled in the art and are within the intended scope of the present invention. The forms described herein are further intended to explain the best modes known for practicing the invention and to enable those skilled in the art to utilize the invention in such, or other, forms and with various modifications required by the particular applications or uses of the present invention. It is intended that the appended claims be construed to include alternative forms to the extent permitted by the prior art.

What is claimed is:

1. A method of assembling a printed product on a binding line comprising:

writing personalized electronic information to a data storage device on the binding line;

associating the written data storage device with a printed product on the binding line; and printing personalized indicia on the printed product on the binding line after writing personalized information to the data storage device based upon what was written to the data storage device.

2. The method of claim 1, wherein the printed product comprises a magazine.

3. The method of claim 1, wherein the data storage device comprises an optical disc.

4. The method of claim 1, wherein printing personalized indicia on the printed product on the binding line occurs after associating the written data storage device with the printed product.

5. The method of claim 1, wherein the personalized indicia includes address information.

6. The method of claim 1, further comprising binding a personalized signature into the printed product on the binding line, wherein the personalized signature includes indicia that corresponds to the personalized information written to the data storage device.

7. The method of claim 1, further comprising selectively binding the printed product with designated signatures based on the personalized information that is written to the data storage device.

8. The method of claim 1, wherein the personalized information is written to the data storage device by a data-writing machine.

9. The method of claim 8, wherein the data-writing machine is part of a hopper positioned on the binding line.

10. The method of claim 1, further comprising printing personalized indicia on the data storage device on the binding line, wherein the personalized indicia corresponds to the personalized information written to the data storage device.

11. The method of claim 1, further comprising reading the personalized information from the data storage device on the binding line.

12. The method of claim 11, wherein the personalized information is read from the data storage device by a data-reading machine that is part of a hopper positioned on the binding line.

13. A method of assembling a printed product on a binding line comprising:

reading electronic information on a binding line from a data storage device that has been pre-personalized offline with respect to the binding line;

printing personalized information on the printed product based on the information read from the data storage device; and associating the data storage device with the printed product on the binding line.

14. The method of claim 13, wherein the data storage device comprises an optical disc.

15. The method of claim 13, wherein the printed product comprises a magazine.

16. The method of claim 13, and further comprising assembling the printed product based on the information read from the data storage device including binding a personalized signature into the printed product that includes personalized indicia that corresponds to the information read from the data storage device.

17. The method of claim 13, and further comprising assembling the printed product based on the information read from the data storage device including selectively binding the printed product with designated signatures based on the information read from the data storage device.

18. The method of claim 13, further comprising writing personalized electronic information to the data storage device on the binding line.

19. The method of claim 18, wherein the personalized information is written to the data storage device by a data-writing hopper positioned on the binding line.

20. The method of claim 13, wherein the information is read from the data storage device by a data-reading hopper positioned on the binding line.

21. The method of claim 13, further comprising printing personalized indicia that corresponds to the information read from the data storage device on at least one of the signatures of the printed product on the binding line.

22. The method of claim 13, further comprising printing personalized indicia on the data storage device that corresponds to the information read from the data storage device on the binding line.

23. The method of claim 13, wherein the information read from the data storage device comprises personalized information.

24. An apparatus for assembling printed products comprising:

a conveyor;

a first feeder located adjacent the conveyor adapted to feed a data storage device toward the conveyor;

a data storage device reader adjacent the conveyor and adapted to read the electronic information stored on the data storage device;

a plurality of second feeders located adjacent the conveyor and adapted to feed printed products toward the conveyor;

a binder positioned along the conveyor and capable of binding the printed products and the data storage device into an assembled product; and a printer positioned along the conveyor and capable of printing on the assembled product in response to information read from the data storage device.

25. The apparatus of claim 24, further comprising a controller communicating with the plurality of second feeders and the data storage device reader, wherein the controller selectively signals the second feeders to feed designated printed products toward the conveyor based upon the information read from the data storage device, and wherein the data storage device is associated with the designated printed products on the conveyor.

26. The apparatus of claim 24, wherein the information read from the data storage device comprises personalized information.

27. The apparatus of claim 26, wherein the personalized information includes the address of the recipient of the assembled product.

28. The apparatus of claim 24, wherein the data storage device comprises an optical disc.

29. The apparatus of claim 24, wherein the printed product comprises a magazine.

30. The apparatus of claim 24, further comprising a data writing machine adjacent the conveyor and adapted to write electronic information to the electronic data storage device.

31. An apparatus for assembling a product comprising:

a conveyor;

a feeder located adjacent the conveyor adapted to feed an electronic data storage device toward the conveyor;

a data writing machine adjacent the conveyor and adapted to write electronic information to the electronic data storage device;

a plurality of printed product feeders located adjacent the conveyor and adapted to feed printed products toward the conveyor;

a binder positioned along the conveyor and capable of binding the printed products and the data storage device into an assembled product; and a printer positioned along the conveyor and capable of printing personalized indicia onto the assembled product, wherein the personalized indicia corresponds to the personalized information that is written to the data storage device.

32. The apparatus of claim 31, wherein the assembled product comprises a magazine.

33. The apparatus of claim 31, wherein the data storage device comprises an optical disc.

34. The apparatus of claim 31, and further comprising a second printer that prints personalized indicia on at least one of the printed products that is fed toward the conveyor, wherein the personalized indicia corresponds to the personalized information that is written to the data storage device.

35. The apparatus of claim 31, further comprising a controller communicating with the plurality of printed product feeders and the data writing machine, wherein the controller selectively signals the printed product feeders to feed designated printed products toward the conveyor based upon the personalized information that is written to the data storage device, and wherein the data storage device is associated with the designated printed products on the conveyor.

* * * * *